June 18, 1968     D. V. FRYDENBERG     3,388,839

METERING DISPENSER WITH PISTON CONFINED IN A ROTATABLE ELEMENT

Filed Dec. 12, 1966

INVENTOR
Donald V. Frydenberg
BY
Wofford & Felsman
ATTORNEYS

United States Patent Office 3,388,839
Patented June 18, 1968

3,388,839
METERING DISPENSER WITH PISTON CONFINED IN A ROTATABLE ELEMENT
Donald V. Frydenberg, Rte. 2, P.O. Box 526, Longview, Tex. 75601
Filed Dec. 12, 1966, Ser. No. 600,998
5 Claims. (Cl. 222—219)

ABSTRACT OF THE DISCLOSURE

My invention relates to apparatus for dispensing a metered amount of material from an associated container, generally of the collapsible type such as, for example, a toothpaste tube. This specification discloses a preferred manner of constructing a dispenser in accordance with my concept of utilizing a dispenser body having a rotatable element which includes an aperture containing a free-floating, pressure responsive piston. Pressure generated inside the container moves the piston and fills the aperture with the material to be dispensed. The rotatable element may then be rotated so that subsequent pressure from the container again moves the piston, but in an opposite direction, to discharge a metered amount of material from the dispenser. Also disclosed is a form of piston having sealing lips extending from it, peripheral edges to adapt the dispenser for use with liquids of low viscosity, and a form of rotatable element secured by an interference fit in a locked position in the body of the dispenser.

---

Previously, dispensers have been developed which utilize inside a carriage a free-floating piston that moves responsive to pressure exerted by a paste or liquid inside the associated container. Such devices are generally threaded on each end and after the container, if of the collapsible type, has been squeezed to move the piston in one direction to partially fill the carriage, the piston containing carriage is removed from the container and its opposite end then attached to the container. When the container is again squeezed the pressure therein moves the piston in the opposite direction from its previous movement to force the paste or liquid on the opposite side of the piston from the carriage. Examples of devices which function in the above manner may be seen in the patents issued respectively to Schleicher and Garvey, U.S. Patent Nos. 2,186,711 and 2,591,145.

It is disadvantageous to move first one end and then another of a metering dispenser into engagement with a paste or liquid container. This procedure can be especially difficult for children whose levels of physical skills makes it difficult to accomplish seemingly simple tasks.

The general object of my invention is to provide an improved form of metering dispenser.

Another object of my invention is to provide a metering dispenser of the free-floating piston type with a combination of components which eliminates the necessity for attaching first one end and then another of the dispenser to the associated container.

Another object of my invention is to provide in a free-floating type paste or liquid metering dispenser a piston configuration which is especially suitable for use in dispensing liquids of low viscosity.

These and other objects are effected by my invention as will be apparent from the following description taken in accordance with the accompanying drawing, forming a part of this application in which.

Figure 1:
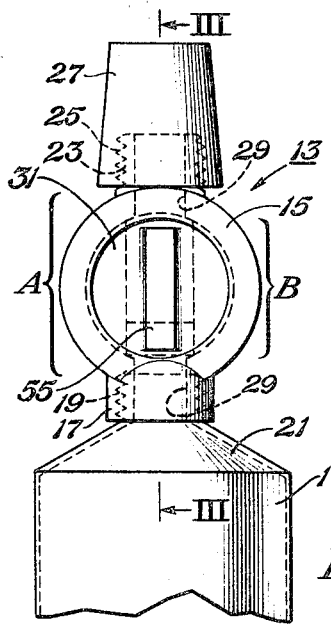
FIG. 1 is a front elevational view of a metering dispenser secured to a container and constructed in accordance with the principles of my invention.

Referring initially to FIG. 1, the numeral 11 designates a paste or liquid container of conventional type. In this instance the container 11 may be a toothpaste tube but it should be understood that my dispenser may be used to discharge a metered quantity of medicament, emollient, ointment or other substance in liquid, semi-liquid, paste or other form. My metering dispenser, designated generally by the numeral 13, includes a body 15 having an inlet end 17 threaded as indicated by the numeral 19 to be secured to the discharge end 21 of a paste or liquid container 11. Also, the body 15 has an outlet end 23 adapted by threads 25 to receive a sealing cap 27 which is of the type generally provided with tube type paste containers.

The body 15 has a passageway 29 which extends between and through the inlet and outlet ends 17, 23. This passageway has an enlarged region B in the approximate midsection thereof, and in the embodiment shown in the drawing region B is substantially circular in cross section.

Figure 2:
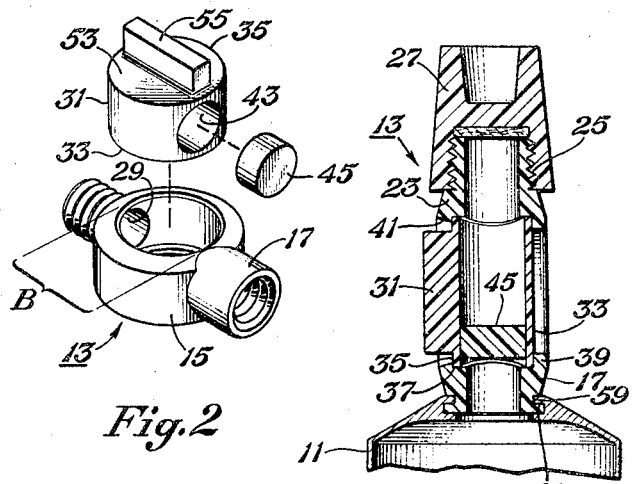
FIG. 2 is an exploded perspective view of the metering dispenser of FIG. 1.

A rotatable element 31 (see especially FIG. 2) is adapted to be sealingly carried by said body in the enlarged region B of passageway 29. As illustrated in the drawing, the rotatable element 31 is preferably cylindrical with its peripheral edges 33 and 35 engaging upper and lower annular shoulders 37, 39 (see FIG. 3) formed in in the enlarged region B. Upper shoulder 37 is chamfered as indicated by the numeral 41 and the rotatable element 31 is pressed into rotatable confinement and interference fit between the shoulders 37, 39 of body 15.

Extending through rotatable element 31 is an aperture 43 that may be selectively aligned or misaligned with those portions of the passageway 29 which extends through the inlet and outlet ends 17, 23 of the body 15 by rotation of rotatable element 31.

A free-floating piston 45 is confined within the aperture 43 of the rotatable element 31 to move in either direction along the length thereof when subjected to a pressure differential. The diameter of the aperture 43 and of the piston 45 are sized such that they sealingly engage each other to prevent substantial flow of liquid or paste past the piston.

Figure 7:
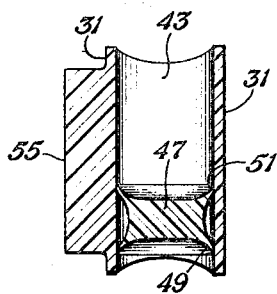
FIG. 7 is a cross sectional view showing a modified form of free-floating piston that is especially suitable for use in dispensing liquids of low viscosity from metering dispensers constructed in accordance with the principles of my invention.

Illustrated in FIG. 7 is another form of piston 47 which may also be inserted within the aperture 43 of the rotatable element 31. This piston may be said to be essentially cylindrical except it is provided with flexible annular sealing lips 49, 51 which extend obliquely from the peripheral edges thereof to form an effective liquid seal with the cylindrical surface defining aperture 43. The piston may be constructed of "Teflon," synthetic rubber or equivalent material which will produce flexibility in the annular sealing lips 49, 51 when formed.

Upper planar surface 53 of rotatable element 31 may be provided with gripping means 55, here in the form of an elongated protrusion, which may be conveniently grasped between thumb and forefinger.

Figure 3:
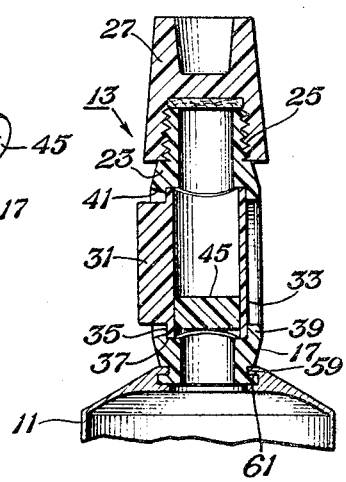
FIG. 3 is a cross sectional view as seen looking along lines III—III of FIG. 1, except a modified means is shown for securing the dispenser to the end of the container.

The inlet end 17 of the dispenser body 15 may be adapted for permanent attachment to the container 11, as is illustrated in FIG. 3. An annular groove 59 may be formed near the extremity of inlet end 17 to receive an annular shoulder 61 formed on the discharge end of container 11. Thus, the dispenser body 15 may be secured to the container 11 in a manner that enables convenient permanent assembly of these components, enabling the dispenser and container to be sold as an integral, disposable unit.

Figure 4:
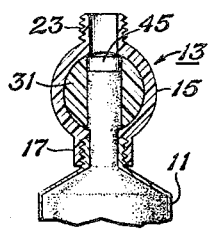
FIGS. 4, 5 and 6 are cross sectional views showing the sequence of operation of my metering dispenser.
Figure 5:
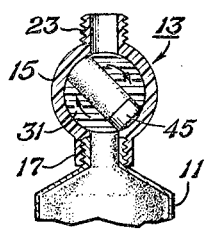
Figure 6:
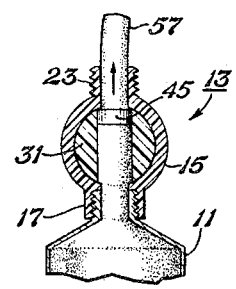

The operation of the paste or liquid metering dispenser illustrated in the drawing may be best understood with reference to FIG. 4 through 6. If the paste or liquid container 11 is of the collapsible wall type like a toothpaste tube, it is squeezed to force under pressure a quantity of liquid or paste from the discharge end 21 thereof. The paste or liquid, if additional pressure is applied, will eventually drive the free-floating piston 45 against the cylindrical surface of the enlarged region B of the passageway 29 which extends through body 15. Thus, the paste or liquid essentially fills, except for the volume occupied by piston 45, the aperture 43 of rotatable element 31 as shown in FIG. 4. Next the gripping means 55 is grasped and the rotatable element moved 180 degrees, as indicated in FIG. 5, until the aperture 43 is again aligned with those portions of the passageway 29 that extend through body 15. Then pressure is applied to the collapsible container 11 which forces the piston 45 once again toward the outlet end 23 of the dispenser, while simultaneously refilling the aperture 43 within the rotatable element 31. Additional metered amounts of paste or liquid may be discharged from the dispenser by once again moving rotatable element 180 degrees and by reapplying pressure to the collapsible walls of the container 11.

It should be apparent from the foregoing that I have provided an invention having significant advantages. It is not necessary that the dispenser be moved after each dispensing operation, for the rotatable element may be moved in the above described convenient manner in preparation for each dispensing step. The form of rotatable element illustrated in the drawing and described above may be easily fabricated and assembled within the body of the dispenser and retained by interference fit in the manner previously described. This greatly simplifies the manufacture and assembly of the dispenser and makes possible economical production rates. The specific form of free-floating piston illustrated in FIG. 7 enables the use of this dispenser with liquids having extremely low viscosities and yet does not appreciably increase the manufacturing costs.

While I have shown my invention in only a limited number of forms it should be apparent to those skilled in the art that it is not so limited but is susceptible to various changes and modifications without departing from the spirit thereof.

I claim:
1. A paste or liquid metering dispenser comprising:
    a body having an inlet end secured to the discharge end of a paste or liquid container and an outlet end generally adapted to receive a sealing cap, said body having a passageway extending between its inlet and outlet ends, with an enlarged region between said ends that is substantially circular in longitudinal cross section;
    a rotatable element sealingly carried by said body in the enlarged portion of said passageway and having an aperture extending therethrough that may be selectively aligned or misaligned with the passageway of said body;
    a free-floating piston sealingly confined within the aperture of said rotatable element to move in either direction along the length thereof when subjected to a pressure differential; whereby paste or liquid may be discharged from the container into the passageway of said body and the aperture of the rotatable element to drive said piston to a position to essentially fill said aperture with paste or liquid, said rotatable element rotated, and the pressure of the paste or liquid generated on the opposite side of said piston to simultaneously refill the aperture while forcing a metered amount of paste or liquid from the outlet end of said body;
    said rotatable element being cylindrical with peripheral edges of substantially planar end surfaces engaging annular shoulders on said body and being assembled by press-fit past a chamfered one of said shoulders, with at least one planar surface having gripping means formed thereon to facilitate rotation thereof.

2. The dispenser defined by claim 1 in which said piston is cylindrical with annular and flexible sealing lips extending obliquely from the peripheral edges thereof to form a liquid seal with a cylindrically formed aperture in said rotatable element.

3. In a metering dispenser including a body adapted to be secured to a paste or liquid container, said body having a passageway with an enlarged region that is substantially circular in longitudinal cross section; a rotatable element having an aperture extending therethrough and being sealingly secured in said enlarged portion; and a piston confined within the aperture of said rotatable element, the improvement comprising:
    said rotatable element having the form of substantially a circular right cylinder;
    the enlarged region of the passageway of said body extending to the exterior thereof and defining a peripheral edge and annular shoulder that extends radially inward to a diameter slightly smaller than the diameter of the cylindrical portion of said rotatable element;
    said rotatable element being assembled by press-fit past said shoulder to a confined position in the enlarged region of the passageway of said body; and
    a gripping means formed on one end of said rotatable element to facilitate rotation thereof.

4. The dispenser defined by claim 3 in which the enlarged region of the passageway of said body extends through said body to define peripheral edges and radial shoulders separated a distance slightly larger than the height of said circular right cylinder forming the exterior of the rotatable element, one of said shoulders having its peripheral edge chamfered to facilitate press-fit assembly of the rotatable element.

5. The dispenser defined by claim 3 in which said piston is cylindrical with annular and flexible sealing lips extending obliquely from the peripheral edges thereof to form a liquid seal with a cylindrically formed aperture in said rotatable element.

References Cited
UNITED STATES PATENTS

| 1,975,154 | 10/1934 | Jordan | 222—219 |
| 2,995,451 | 8/1961 | Leach. | |
| 3,272,406 | 9/1966 | Lehmann | 222—531 |
| 3,292,824 | 12/1966 | Arp et al. | 222—250 |

FOREIGN PATENTS

| 806,316 | 9/1936 | France. |

ROBERT B. REEVES, *Primary Examiner.*

KENNETH N. LEIMER, *Examiner.*